United States Patent
Bestler et al.

(10) Patent No.: US 9,529,084 B2
(45) Date of Patent: Dec. 27, 2016

(54) MEASURING DEVICE FOR OPTICALLY SCANNING AN ENVIRONMENT

(71) Applicant: HEXAGON TECHNOLOGY CENTER GMBH, Heerbrugg (CH)

(72) Inventors: Simon Bestler, Langenargen (DE); Jochen Scheja, Heerbrugg (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 26 days.

(21) Appl. No.: 14/511,015

(22) Filed: Oct. 9, 2014

(65) Prior Publication Data

US 2015/0109627 A1    Apr. 23, 2015

(30) Foreign Application Priority Data

Oct. 9, 2013   (EP) ..................................... 13187896

(51) Int. Cl.
| | |
|---|---|
| G01S 17/06 | (2006.01) |
| G01C 15/00 | (2006.01) |
| G01S 17/02 | (2006.01) |
| G01S 7/481 | (2006.01) |
| G01S 7/497 | (2006.01) |
| G01S 17/42 | (2006.01) |

(52) U.S. Cl.
CPC .............. *G01S 17/06* (2013.01); *G01C 15/002* (2013.01); *G01S 7/4812* (2013.01); *G01S 7/4817* (2013.01); *G01S 7/4972* (2013.01); *G01S 17/023* (2013.01); *G01S 17/42* (2013.01)

(58) Field of Classification Search
CPC ...... G01S 17/06; G01S 17/023; G01S 7/4817; G01S 7/4212; G01C 15/002; G01C 15/00; G01C 15/004

USPC .......... 356/4.01, 5.01, 51, 610, 601; 33/290, 33/291, 292

See application file for complete search history.

(56) References Cited

U.S. PATENT DOCUMENTS

| | | | |
|---|---|---|---|
| 8,638,446 B2 | 1/2014 | Briggs | |
| 8,694,675 B2 | 4/2014 | Wang et al. | |
| 9,074,883 B2* | 7/2015 | Schumann | ............... G01C 3/02 |
| 9,341,474 B2* | 5/2016 | Plangger | ............... G01S 7/4817 |
| 2005/0141052 A1* | 6/2005 | Becker | ................... G02B 26/10 |
| | | | 358/475 |

(Continued)

FOREIGN PATENT DOCUMENTS

| | | |
|---|---|---|
| CN | 103003713 A | 3/2013 |
| EP | 1517415 A1 | 3/2005 |

(Continued)

OTHER PUBLICATIONS

Lim, Sung- Haw et al. "Inter-Chunk Popularity-Based Edge-First Caching in Concent-Centric Networking." IEEE Communications Letters, vol. 18, No. 8, Aug. 2014. https://www.scribd.com/doc/239275190/Inter-Chunk-Popularity-Based-Edge-First-Caching.

*Primary Examiner* — Sang Nguyen
(74) *Attorney, Agent, or Firm* — Maschoff Brennan

(57) ABSTRACT

The invention relates to a measuring device (1), in particular a laser scanner for optically scanning and measuring an environment. The measuring device (1) comprises a rotatably mounted measuring head (2) and a rotation unit (10) mounted therein and having a rotatably mounted rotation body (20), wherein a targeting element (70) for sighting a target point is integrated into the rotation body (20), said targeting element comprising an opening (70') passing through the rotation body (20).

20 Claims, 6 Drawing Sheets

(56) References Cited

U.S. PATENT DOCUMENTS

| | | | |
|---|---|---|---|
| 2006/0232786 A1* | 10/2006 | Jokinen | G01B 11/24 356/601 |
| 2006/0245717 A1* | 11/2006 | Ossig | G01C 15/002 385/147 |
| 2010/0195086 A1* | 8/2010 | Ossig | G01S 7/491 356/5.01 |
| 2010/0208318 A1* | 8/2010 | Jensen | G01S 7/4817 359/200.7 |
| 2012/0069325 A1* | 3/2012 | Schumann | G01C 3/02 356/51 |
| 2012/0133953 A1* | 5/2012 | Ossig | G01S 7/497 356/601 |
| 2013/0010307 A1* | 1/2013 | Greiner | G01C 15/002 356/601 |
| 2014/0009604 A1 | 1/2014 | Hinderling et al. | |
| 2015/0096181 A1* | 4/2015 | Plangger | G01S 7/4817 33/290 |
| 2015/0098075 A1* | 4/2015 | Bestler | G01C 15/002 356/3.01 |

FOREIGN PATENT DOCUMENTS

| | | | | |
|---|---|---|---|---|
| EP | 1906141 | A2 | 4/2008 | |
| EP | 1906142 | A2 * | 4/2008 | ........... G01C 15/002 |
| EP | 2 523 017 | A1 | 11/2012 | |
| EP | 2620746 | A1 | 7/2013 | |

\* cited by examiner

MEASURING DEVICE FOR OPTICALLY SCANNING AN ENVIRONMENT

FIELD OF THE INVENTION

The invention relates to a measuring device, in particular a laser scanner, for optically scanning or measuring an environment. The measuring device comprises a rotation unit with a deflection element, for deflecting a transmission light beam and a reception light beam, and a rotation body.

BACKGROUND

Measuring devices or scanners of the type mentioned in the introduction are designed to measure a spatial region and/or an object three-dimensionally. Typical applications include, for example, the measurement of interiors, such as churches and factory buildings, large objects, such as buildings or aircraft, or else the forensic measurement of an accident site.

In order to measure these objects, by means of a laser scanner, a predefined spatial volume is scanned with a laser beam and the laser light reflected from the object is detected, wherein the angle information for the direction of the emitted laser beam and of the detected laser light is acquired for each point in time. By means of the detected laser light, the distance between a surface point situated in the spatial volume and the measuring device can be determined by triangulation and/or time-of-flight measurement or phase shift. Together with the angle information associated with said surface point, it is possible to calculate the spatial position of said surface point. From the sequence of measurement points recorded in this way, or the positions in space calculated therefrom, a three-dimensional model of the scanned surface, of the object or of the scanned environment is generated by corresponding software, e.g. in the form of a three-dimensional point cloud.

Devices for optically scanning an environment that are embodied as laser scanners, one of which in accordance with the prior art is illustrated by way of example in FIG. 1, usually comprise a measuring head 2, the housing 5 of which accommodates on one side a radiation source 6 for generating a transmission light beam 13 and a detector 8 for receiving the transmission light beam 13 reflected from objects in the environment, this being designated for short as reception light beam 17 or reflection radiation. In this case, "reflection radiation" is also understood to mean transmission light radiation scattered from objects in the environment in the direction of the measuring device, which occurs for example particularly in the case of objects having a very rough surface or else for example in the case of deciduous trees.

Furthermore, the housing 5 accommodates optical components 7 for collimating and diverting the transmission light beam 13 and the reflection radiation 17. The measuring head 2 or the housing is mounted on a base 3 rotatably about a base axis 4, said base generally having an adapter for fixing on a stand 19 or other carrier. The measuring head 2 or the housing 5 is generally rotatable about base axis 4 manually and/or in a motor-driven manner and in a manner supervised by a control unit 9. On an opposite side of the housing 5 relative to the beam source 6, the detector 8 and the optical components 7, a rotation unit 10 with a deflection element 22 is supported in the housing 5, by means of which rotation unit the transmission light beam 13 is emitted in a supervised manner, in an aligned manner into the environment, and the reflection radiation 17 is captured.

For this purpose, the rotation unit 10 with the deflection element 22 is mounted in the housing 5 rotatably about a rotation axis 11 in a manner driven by means of a motor 15. The rotation axis 11 is perpendicular to the base axis 4, and the deflection element 22 is generally arranged in a manner inclined by an inclination angle of 45° relative to the rotation axis 11. The point of intersection of base axis 4 and rotation axis 11 generally corresponds to the point of impingement of the concentrated transmission light beam 13 on the deflection element 22, said point also being designated as deflection point 23. By rotating the measuring head 2 about the base axis 4 and rotating the rotational unit 10 about the rotation axis 11, it is possible to carry out a three-dimensional scan.

On account of its complex internal optomechanical construction and the arrangement of the laser beam elements, the calibration of a scanner in accordance with the prior art is very demanding. The local, instrument-linked coordinate system of a scanner is described by parameters such as angle deviations and offsets of the rotary and targeting axes. Important calibration parameters include: tilting axis skew, the horizontal and vertical erroneous angles of the laser targeting direction, the angle error and the position of the deflection element or rotary mirror, the skew of the rotary axis (designated here generally as rotation axis) with respect to the vertical axis (designated here generally as base axis), etc. Hitherto, therefore, the determination of these parameters has been ascertained initially prior to delivery of the device by means of a factory calibration, which can be based on a two-position measurement, for example, as described in EP 2 523 017 A1.

A fast, efficient field calibration which would allow the user of the device to determine the present parameters on site has not been possible heretofore. Firstly, a fast efficient field calibration presupposes a precise setting unit, which is not available in every scanner, and, secondly, the instructions and mathematical models known from the literature for calibration with only one data set of a two-position measurement from a single instrument installation (rapidity and efficiency of the calibration!) are provided mainly for device constructions which do not correspond to the realized optomechanical construction of the scanner present, such that they are unusable for precisely determining the coordinate system of the given scanner. If the coordinates of reference points are not known beforehand and if only one data set of a two-position measurement from a single instrument installation is present, then the desired parameters cannot be determined by means of the models provided in the literature. This is because if no position information of the reference or target points is known, then the compensation problem in the evaluation of a data set from a two-position measurement becomes singular, and the calibration parameters are not fully determinable.

In order to be able to sight a target by means of a measuring device of the generic type, the prior art discloses various sighting units, such as, for example, a camera integrated into the housing of the measuring head on the side of the laser light source. Images acquired by said camera can be represented for sighting purposes in particular as a live image on a display. What is disadvantageous about measuring devices embodied in such a way is often the complexity of their operation. Moreover, the construction of such measuring devices, in particular for the optics used, is expensive. Moreover, the images necessarily recorded by a camera, which requires an additional power supply, have to be processed by corresponding software. Furthermore, a control and evaluation unit is necessary for the targeting process.

As an alternative form of providing the live image, the European Patent Application EP 12153163.6 in the name of the present applicant, and not yet previously published, discloses an eyepiece which is likewise arranged in the housing of the measuring head on the side of the camera and the laser light source and is equipped in particular with a target marking indicating the emission direction, e.g. in the form of a reticle. Said application also discloses an imaging system comprising an imaging optical unit and a display for graphically providing an imaging as a live image. The scanning region is selected according to a method corresponding to the prior art, involving the production of an overview scan and a corresponding overview image. With the aid of the image generated by the overview scan, the user then selects the region to be scanned, which is then scanned and measured in specific detail by means of a fine scan.

SUMMARY

Some embodiments of the invention may provide an alternative to the measuring devices mentioned above.

This alternative measuring device is intended to be primarily less complex in its construction and operation, more cost-effective and more robust.

For this purpose, it is intended to be usable more flexibly, that is to say in a manner better adapted to the respective measuring requirements, and to enable for example a fast calibration on site.

A measuring device according to the invention, which is embodied in particular as a laser scanner and serves for optically measuring an environment, comprises a rotatably mounted measuring head and a radiation source integrated in the measuring head and serving for generating a transmission light beam, a reception sensor integrated in the measuring head and serving for detecting reflected transmission light radiation returning as reception radiation, and a rotation unit mounted in the measuring head. The rotation unit comprises a rotation body which is mounted rotatably about its rotation axis at least on one side, with a deflection element for the aligned deflection of the transmission light beam into the environment and capture and deflection of the reception light beam. According to the invention, a targeting element is integrated into the rotation body, said targeting element comprising an opening passing through the rotation body. The through opening allows the rotation body to be used as a supporting structure for the targeting element.

In the context of the present invention, as a rotation body is understood a body which has, in its basic embodiment, a surface, which corresponds to a boundary surface formed by rotation of a curved line around a rotation axis, or in other words: The surface of this body is a boundary surface aligned rotationally symmetric with respect to a rotation axis of the body. Examples of such bodies of rotation are torso, cylinder, cone and truncated cone. The rotation axis of this body of rotation used according to the invention coincides with the rotation axis of the measuring device (also called tipping axis), which is in general perpendicular to the base axis of the device. For the use of the body of rotation in the described measuring device according to the invention, in this case, it is also possible that the body of rotation is modified, for example by tapering or arranging one or more bores, at one or both axial ends in such a way that this final part does no more correspond to the definition of the ideal body of rotation. However, the basis reform of the body of rotation remains unchanged such that it shows, except for its final part, a boundary surface which is rotationally symmetric with respect to its rotation axis.

It is possible to look through the through opening in the rotation body and to sight a target. The rotatability of the rotation body about the rotation axis and the rotatability of the measuring head carrying the rotation body about the base axis allow the targeting element to be aligned with a desired target easily. The arrangement of the through opening or of the targeting element relative to the transmission light beam that is deflected at the deflection element and emitted in an aligned fashion is known accurately by means of the angle encoders present in a known way. Therefore, the alignment of the field of view of the targeting element in relation to the alignment of the transmission light beam emitted from the deflection point is also known accurately and can be taken into account by the user if said user, after sighting the target by means of the targeting element, wants to set the laser beam of the measuring device to said target.

In one advantageous configuration, an optical unit and/or a target marking can be integrated into the targeting element.

The optical unit can be configured in such a way that it allows a 10-fold or a 30-fold or higher magnification or variably an e.g. up to 30-fold magnification and in this way simplifies accurate sighting of the target. In other words, the targeting element is then embodied in the form of a telescope, wherein this can be embodied in the form of a Galilean telescope or in the form of a Keppler telescope.

The target marking assists in the accurate sighting of a target in a known manner and can be configured as a sight, that is to say as a virtual projection into the object space, or can be embodied in a known manner in a real way in the form of color markings, tensioned threads, etc. In both cases, in a manner adapted to the respective requirements, target markings from the traditional types of reticle through to scaled line markings are possible. Examples thereof are depicted in FIG. 8.

In combination, the magnifying optical unit integrated into the targeting element and the target marking form a telescopic sight integrated into the rotation carrier.

Since the targeting element is situated outside the beam path of the transmission light beam, the construction of the device is very simple and robust. There is no need for a specific optical unit to enable the transmission light beam and/or the reception light beam to be coupled out of and/or into the beam path of the targeting element or conversely to enable the field of view of the targeting element to be amalgamated with the beam path of the beams. No software, hardware, electrical energy or computation time is required to sight a target. Moreover, the entire measuring device can be constructed more compactly since no space for a camera or for a display is required in the housing.

Nevertheless, it is possible, of course, to equip the measuring device with software support for the user. In this regard, in the measuring device a control unit can be provided, which is configured by means of software in such a way that spatial coordinates of a target sighted with the aid of the targeting element are acquirable and storable. The control unit can furthermore be configured by means of software in such a way that motors for rotating rotation body and for measuring head are controllable in such a way that the transmission light beam is alignable with said target. The control unit can also be configured by means of software in such a way that the motors for rotating measuring head and/or rotation body are drivable such that the targeting element integrated in the rotation body is alignable with predetermined coordinates.

The alignment of the transmission light beam with the sighted target is particularly simple if the targeting element or the through opening in the rotation body is arranged at a defined angle with respect to the transmission light beam impinging on the deflection element at a deflection point, in particular at an angle of 90° with respect to the rotation axis.

If the deflection element is aligned at an angle of 45° with respect to the rotation axis and with respect to the base axis and if the transmission light beam is deflected at the deflection element at a deflection point corresponding to the point of intersection of the rotation axis and the base axis, it is particularly advantageous to arrange the targeting element or the through opening in the rotation body at an angle of 90° with respect to the rotation axis and/or with respect to the base axis. The alignment of the transmission light beam with the sighted target is even simpler in such a case if the deflection element is embodied as a semitransparent element, e.g. as a semitransparent mirror, and the targeting element or the through opening meets the deflection element at the deflection point, wherein it is arranged in the rotation body coaxially with respect to a deflecting direction in which the measurement radiation is emitted from the deflection point into the environment, and at an angle of 90° with respect to the rotation axis. This enables the user to look directly in the measuring direction when sighting a target.

The incorporation of the targeting element in the measuring direction makes it possible to realize a targeting aid which makes the targeting process by the user independent of a power source and software, for instance, which is more cost-effective and enables simpler operation. The time spent on taking a bearing on a target point to be measured can be reduced. Individual-point measurements are possible with little outlay and a region to be measured can be defined in a simple manner by taking a bearing from three or four corner points—if necessary also a few more—and can then be measured by means of a fine scan.

With the measuring device according to the invention, however, for the first time it is also possible to carry out actual two-position measurements for calibrating the device, such as are described in EP 2 523 017 A1, for example. Since the targeting element integrated into the rotation unit rotates concomitantly therewith, errors in the horizontal collimation and in the vertical index and also the determination of the tilting axis skew can be determined in an automated manner and it is possible to calibrate the alignment of the targeted element with the axial system of the measuring instrument (tilting axis and rotation axis are synonymous with one another here). For this purpose, a target point, preferably a cooperative target point such as a reflector, for example, is sighted a first time by means of the targeting element and the angles of rotation axis and base axis that are associated with this direction finding are stored as first angular position. The housing is subsequently rotated 180° about the base axis and the targeting element in the rotation unit is rotated approximately by 180° about the rotation axis; the target point is sighted a second time by means of the targeting element and the second angular position associated with this direction finding is recorded and stored. The angular positions thus obtained are correspondingly related to one another and compared. Deviations arising in the course of this comparison can be used for determining deviations of the rotation axis and of the base axis from the horizontal and vertical, respectively, and for calibrating the device or the targeting element. With the calibrated targeting element, it is then possible to calibrate the position of the laser beam of the scanning unit in relation to the axial system by carrying out the same procedure with the laser, namely: sighting the target point by means of the laser and storing the first laser angular position; rotating the housing 180° about the base axis and the rotation unit approximately by 180° about the rotation axis; accurately aligning the laser beam with the target point and registering and storing the second laser angular position; comparing the laser angular positions with one another and with the angular positions of the targeting element. The deviations arising from the comparison of the laser angular positions with the angular positions of the targeting element can be used for a calibration of the laser.

With the optical targeting element accommodated in the rotation unit of the scanner, the optomechanical construction of the measuring device is much simpler. A calibration is therefore are carried out in a new way even in a manner based on a single data set of a two-position measurement and on the basis of freely chosen target points, without the absolute or relative coordinates thereof having to be known. The compensation problem assigned for determining the calibration parameters is regular and thus solvable, and so the user of the device according to the invention now has in a new way the possibility of determining all necessary parameters with sufficient accuracy himself/herself, specifically at any time and also on site, in the field. In other words, said user also has the possibility of checking the parameters and, if appropriate, determining them anew if changes in the parameters arise during field use, for example on account of weathering influences (change in temperature and/or moisture etc.) or when the device is used over a relatively long period of time (device heating).

Consequently, the targeting element can be used not only as a very accurate targeting aid in preparation for a scan but also in a theodolite-like function. This advantage can be used for simpler and more accurate 2-position measurement and thus for a faster, more efficient and more precise calibration of the measuring device, in particular with regard to targeting axis errors in the azimuthal direction and vertical axis direction, tilting axis skew, mirror errors and laser beam alignment, wherein here use can also be made of auxiliary means such as are known for theodolites. Moreover, this also enables connection measurements allowing a free deployment of the measuring device.

When the targeting element is incorporated in the measuring direction—that is to say coaxially with respect to the base axis and with a semitransparent deflection element—for safeguarding purposes (eye protection) the targeting element can be provided with a shutter coupled to a controller for the laser. The safety controller operates such that the shutter is always closed when laser light emerges from the housing in the direction of the deflection element, such that it is not possible to look through the targeting element during laser operation. However, alternatively or additionally, the safety controller can also be equipped with a shutter in the beam path of the laser beam and operate such that the emission of laser light is in each case prevented by the shutter being closed if the shutter in the targeting element is opened.

Such a safeguard can, of course, also be provided in all other herein presented variants of the measuring device according to the invention, not just if the targeting element is aligned coaxially with the base axis and perpendicularly to the rotation axis.

If the measurement radiation additionally has a light portion which is visible to the human eye and which is transmitted by the semitransparent mirror, while the other radiation portions of the reception radiation which are essential for the measurement are diverted into the housing onto the detector, then the targeting with a targeting element arranged coaxially with respect to the beam direction becomes even simpler.

In one advantageous configuration, the targeting element comprises a tube which can be integrated into the through opening into the rotation body. An optical unit and/or a target marking can advantageously be integrated into said tube in the sense of a telescope or telescopic sight prior to mounting into the rotation body. The integration of these elements prior to mounting simplifies production. Moreover, the measuring device can be supplied with different exchangeable tubes, wherein the tubes are then equipped with a target marking and/or with different optical units of different magnifications (different types of telescope) for the different requirements. Securing mechanisms for the releasable fixing of the exchangeable tubes are then advantageously provided in or on the rotation body. These may be clamping mechanisms, snap-action mechanisms, screw connections, etc.

In a further, advantageous configuration, the rotation body and/or the measuring head are/is rotatable manually for target alignment.

Independently of the configuration of the rotation body and of the material used for the latter, it is always possible to integrate into the rotation body a targeting element comprising a through opening in the rotation body.

In this regard, the rotation body can for example advantageously be produced from a lightweight material, in particular from a plastic, a fiber reinforced plastic or a light metal, such as aluminum or an aluminum alloy, or from a mixture of such lightweight substances. The use of a material having a low relative density reduces the energy consumption during scanning and reduces measurement errors that otherwise occur on account of bending phenomena attributable to the inherent weight of the rotation body.

The rotation body can be embodied as a solid body. If, moreover, it is produced from a lustrous metal in a solid fashion, the deflection element can be formed integrally with the rotation body by mirror-finish polishing (nm) of the beveled free end of the rotation body.

As an alternative thereto, it is possible to produce the rotation body in a lightweight structure with material cutouts, which allow savings of weight and material and thus contribute to reducing costs.

Advantageously, however, the rotation body can also be embodied as a hollow cylinder. It is then particularly expedient if the targeting element comprises an insertable tube or a plurality of interchangeable tubes (types of telescope), which allow flexible use for instance with different optical units and/or a target marking.

In order to be able to target individual points of the environment in a targeted manner by means of the measuring device, an adjusting mechanism is advantageously provided in the housing of the measuring device, by means of which adjusting mechanism the rotation unit is alignable in a motorized fashion. A computing unit with corresponding software is provided for the motorized alignment.

In one embodiment, the rotation body is mounted rotatably on one side and has a beveled, free end opposite to the mounting side, wherein the deflection element is provided at the beveled, free end.

In a further particular embodiment, the rotation body is mounted rotatably on two sides, the deflection element is integrated in the rotation body, and the rotation body has a passing path on which transmission light beam and reception light beam are guidable to the deflection element and away from the deflection element. This has the advantage that the rotation body and thus also the deflection element are mounted better, is exposed to bending phenomena to a lesser extent and, consequently, the measurement can be carried out more precisely.

In one particularly preferred embodiment, the deflection element is embodied as a semitransparent mirror and is aligned at an angle of 45° with respect to the rotation axis and with respect to the base axis. In this case, the deflection element is arranged such that during operation the transmission light beam impinges on the deflection element at a deflection point and is deflected, wherein the deflection point corresponds to the point of intersection of the rotation axis and the base axis. If the targeting element or the through opening in the rotation body is then arranged at an angle of 90° with respect to the rotation axis and coaxially with the base axis, then during setting by means of the targeting element one looks exactly in the direction in which the transmission light beam is emitted into the environment.

Particularly advantageously, in particular for rotation bodies mounted on two sides, the deflection element is embodied as a three-dimensional optical component, namely in particular as a prism. The optical component or the prism is integrated in the rotation body and is transparent to the visible light in a viewing direction, wherein the viewing direction deviates from a direction of incidence in which the transmission light beam impinges on the deflection element, and the deflection element is integrated in the rotation body in such a way that one looks through the optical component when looking through the opening in the targeting element, said opening passing through the rotation body, in the viewing direction.

In one particular development of this embodiment, the viewing direction deviates from the direction of incidence and from a deflecting direction at which the transmission beam is transmitted into the environment from the deflection element, wherein the viewing direction, the direction of incidence and the deflecting direction are, in particular, in each case perpendicular to one another.

In a different development of this embodiment, the viewing direction and the deflection direction at which the transmission beam is transmitted into the environment are identical. This has the advantage that during sighting one looks directly in the direction in which the transmission beam is deflected.

Independently of the detailed configuration, it is advantageous, of course, if the optical component or prism is provided with an optical unit and/or with a target marking in the viewing direction. For this purpose, optical unit and/or target marking, on the entrance viewing side and/or on the exit viewing side, for example, can be adhesively bonded onto the optical component or prism or can be connected thereto by means of a releasable connection, such as clamping mechanism or screw connection. However, the target marking can be applied for example in the form of colorant, fine wires or threads.

BRIEF DESCRIPTION OF THE DRAWINGS

The device according to the invention is described in greater detail purely by way of example below on the basis of specific exemplary embodiments illustrated schematically in the drawings, further advantages of the invention also being discussed. Identical elements in the figures are provided with identical reference signs. In specific detail, purely schematically in the figures:

FIG. 6b shows, in an illustration the same as FIG. 5b, the rotation unit according to the invention from FIG. 6a.

DETAILED DESCRIPTION

Figure 1:
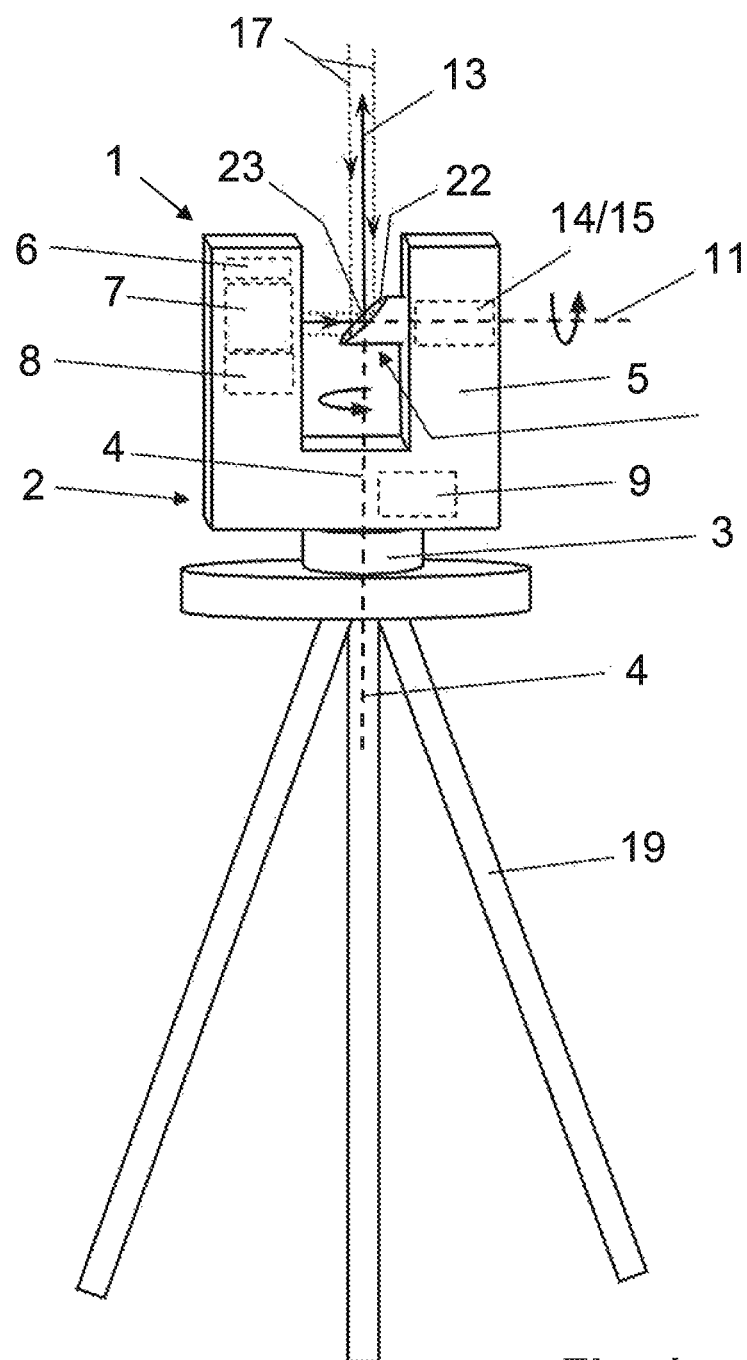
FIG. 1 shows a measuring device embodied as a laser scanner for optical, measuring scanning of the environment, mounted on a stand in accordance with the prior art.

FIG. 1 shows a measuring device in accordance with the prior art, as has already been described in greater detail above.

Figure 2:
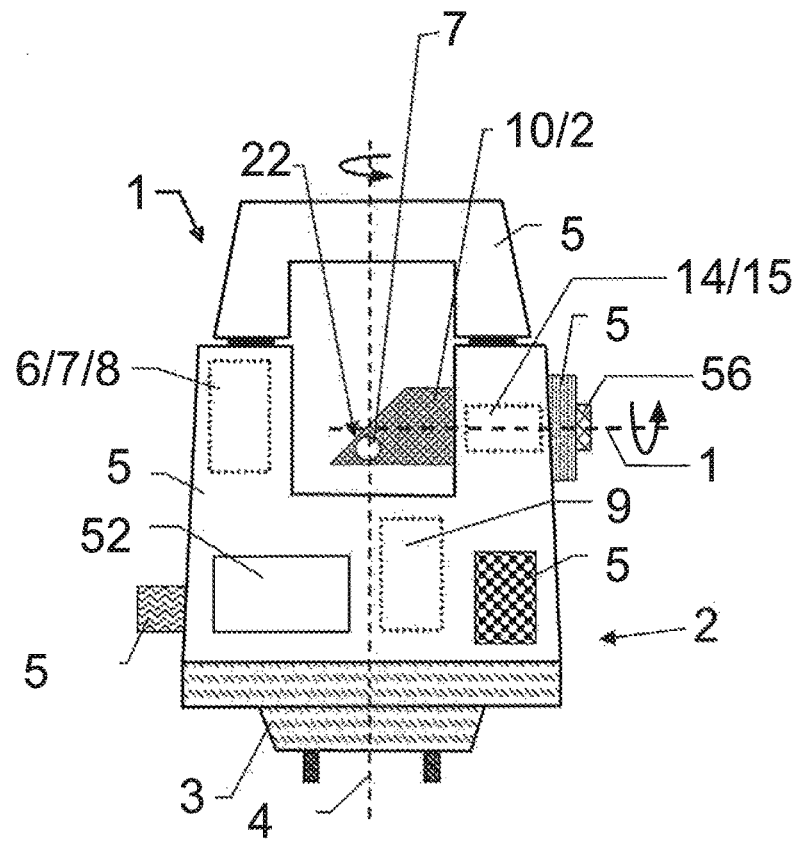
FIG. 2 shows a first embodiment of a measuring device according to the invention without a stand.
Figure 3:
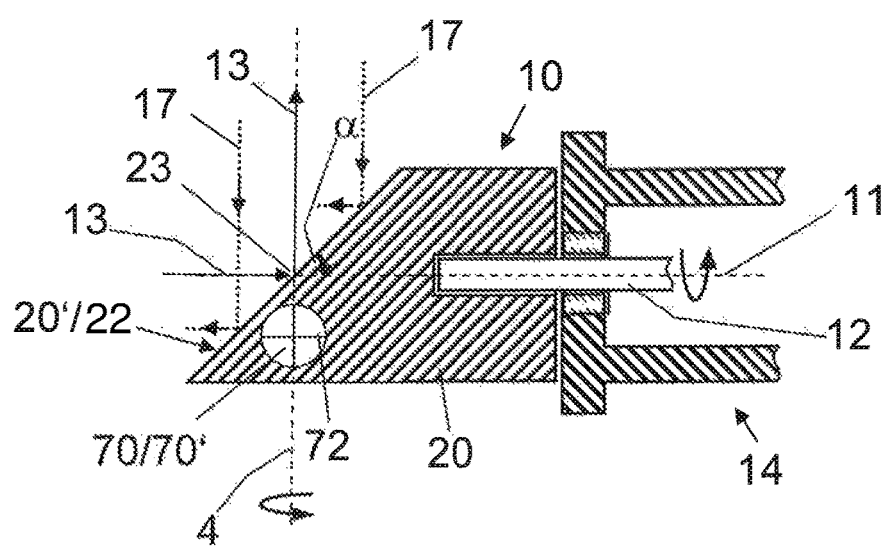
FIG. 3 shows the rotation unit according to the invention from the measuring device according to the invention from FIG. 2 in longitudinal section.

FIG. 2 shows a first embodiment of a measuring device 1 according to the invention with a rotation unit 10 embodied according to the invention, said rotation unit being shown in detail in FIG. 3. The measuring device 1 is equipped, as usual, with a measuring head 2, the housing 5 of which is mounted rotatably about a base axis 4 on a base 3. In the housing 5, provision is made of a radiation source 6 for generating the transmission light beam 13 and a reception sensor 8 for detecting captured reflection radiation 17, which is preferably reflected at a target object, and optical components 7 for beam guiding and collimation of the transmission light radiation 13 and reflection radiation 17. The rotation unit 10, which has a beam deflection element 22 for deflecting the transmission light beam 13 in a targeted manner and for capturing the reception light beam 17, is mounted rotatably about a rotation axis 11 in a manner driven by a motor 15. The motor 15, for its part, is mounted in a motor housing 14 within the housing 5 of the measuring head 2. The deflection element 22 of the rotation unit 10 is inclined by an angle α relative to the rotation axis 11, said angle usually being 45°.

In the example shown here, the rotation unit 10 comprises a solid rotation body 20 composed of metal, the end side 20' of which is polished very finely (μm) and serves as a deflection element 22.

Situated in the rotation body 20 there is a through opening 70', which serves as a targeting element 70 and in which a target marking 72 is fixed (see FIG. 3). The targeting element 70 integrated into the rotation bodies 20 rotates concomitantly during the rotation of the rotation body 22 about the rotation axis 11 thereof.

Taking a bearing on a target object can take place manually by means of a rotation of the measuring head 2 about the base axis 4 by hand or by means of an adjusting rotary knob 54 that acts on an adjusting mechanism (not illustrated) either directly or by means of a corresponding motorization (not illustrated). Control unit 9 with corresponding software can be provided for this purpose. In an analogous manner, for the alignment with a target object, the rotation body 20 with the deflection element 22 can be rotated about the rotation axis 11 manually by means of a second adjusting rotary knob 56. In this case, the adjusting rotary knob 56 cooperates with a coarse drive, wherein motors for a controlled motorized rotation of the rotation unit 10 are additionally provided here as well. Furthermore, a highly precise manual alignment of the rotation body 20 can be carried out by means of a further fine adjusting rotary knob 56a or control pushbutton connected to a fine adjusting mechanism. Upon actuation of the rotary knob 56a, the rotation body 20 is concomitantly rotated with a specific rotary transmission. By means of an electronic sensor, the transmission ratio can also be designed in an adaptive fashion, for example by a rotary movement taking place more slowly, the greater the rotary transmission becomes. The alignability of the rotation body 20 provided in this way makes it possible for the targeting element 70 to be aligned with a target very accurately in both manually and automatically controlled fashion (by means of the motors connected to the respective driveshafts and corresponding software).

In this example, an operating panel 50 is provided for manual inputs on the device, which inputs can be displayed and checked on a display 52, and makes it possible to change settings for sighting a target. Of course, the same mechanisms and settings can also be used after taking a bearing on a target object by means of the targeting element 70—or else without previously taking a bearing—in order to align the measuring device 1 or the transmission light beam 13 with the target object and, for example, to determine the distance from the target object by means of an individual-point measurement or to start a scan. Furthermore, the measuring device 1 has, for example, a handle 58 for simple transport of the device 1. The handle 58 is detachable from the measuring head 2 in a modular manner. For measurements, the handle 58 can be detached in order to be able to cover the largest possible scanning region.

As is evident from the longitudinal sectional view in accordance with FIG. 3, the rotation body 20 can be driven to effect rotation about the rotation axis 11 by means of a shaft 12, preferably by a motor 15 (not illustrated in FIG. 3) arranged in the motor housing 14. For this purpose, the rotation body 20 is typically connected to the shaft 12 for conjoint rotation coaxially relative to the axis 1.

Figure 4A:
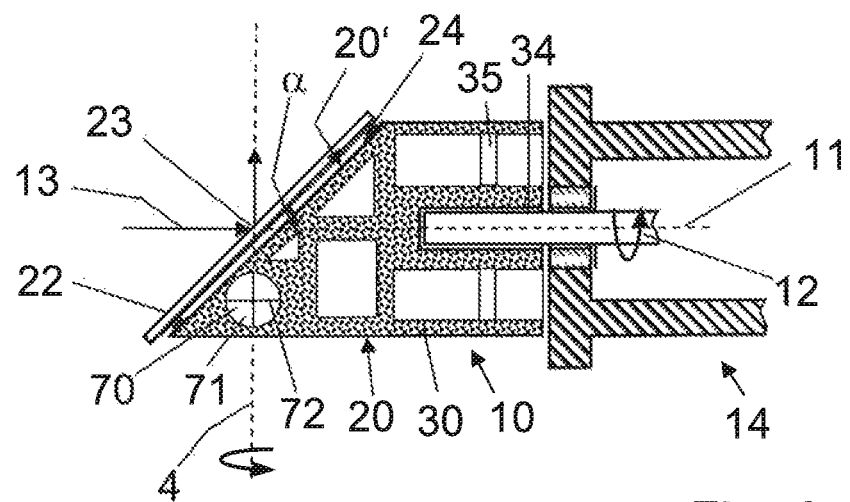
FIGS. 4a, 4b show two alternative embodiments of the rotation unit according to the invention in longitudinal section.

FIG. 4a shows a configuration of a rotation unit 10 according to the invention that is similar to the exemplary embodiment in accordance with FIG. 3, wherein the rotation body 20 of said rotation unit in this example consists not of solid metal but of a lightweight structure 30 comprised of plastic, said structure being relatively light and provided with cutouts. Of course, lightweight constructions composed of steel or a light metal, such as aluminum, for example, or composed of some other material are also conceivable in this case. On the free, beveled end 20' of the rotation body 20, there is arranged as deflection element 22 (preferably at 45°) in this example a polished metal plate or a mirror, which is fixedly connected to the end face 20' of the rotation body 20 by means of an adhesive-bonding connection 24. At the deflection element 22, as in the previous example, the emitted transmission light beam 13 is deflected at a deflection point 23 corresponding to the point of intersection of the rotation axis 11 and the base axis 4. Parts of a cylinder wall 30 of the rotation body 20, which wall arises as a result of the plastic structure, are connected via supporting struts 35 to the inner, central part 34 of the rotation body 20, this part receiving the shaft 12. This gives rise to cutouts in the rotation body which are accessible via an opposite end relative to the free end 20' of the rotation body 20. If necessary, balancing elements can be used here (not illustrated).

The targeting element 70, analogously to that in the exemplary embodiment in FIGS. 2 and 3, is arranged in the rotation body 20 at an angle of 90° with respect to the rotation axis 11 and with respect to the base axis 4, wherein the point of intersection in the target marking 72 as reticle (the graticule) intersects the base axis, but there is a lateral offset with respect to the rotation axis 11 and thus with respect to the deflection point 23. In this example, in the sense of a telescope an optical unit 71 and as target marking 72 a reticle are inserted into the targeting element 70. The targeting element 70 can once again be embodied in a simple manner as a through opening or—advantageously for production—comprise a tube that receives the optical unit 71 and the target marking 72.

Figure 4B:
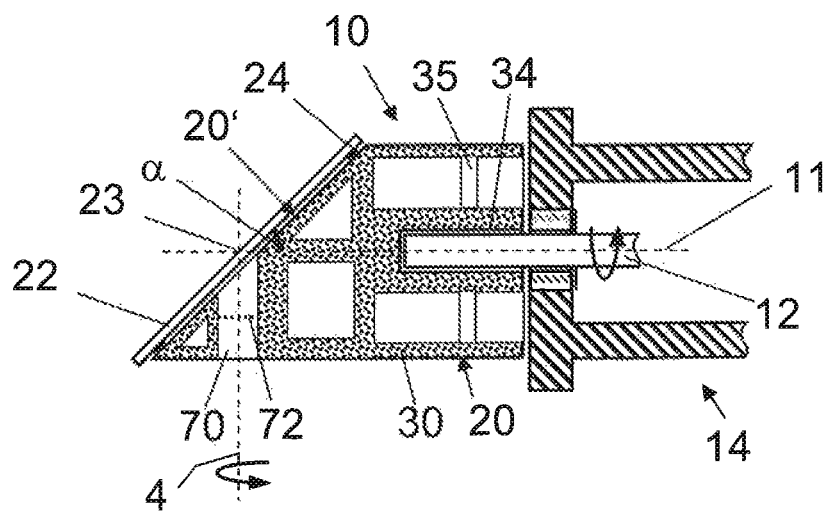

FIG. 4b shows a configuration of a rotation unit 10 according to the invention that is similar to the exemplary embodiment in accordance with FIG. 4a, wherein the rotation body 20 once again consists of a lightweight structure 30 composed of plastic, said structure being relatively light and provided with cutouts.

On the free, beveled end 20' of the rotation body 20, in this example there is arranged as deflection element 22 a semitransparent mirror, which is fixedly connected to the end face 20' of the rotation body 20 by means of an adhesive-bonding connection 24. In this example, however, the targeting element 70 is arranged coaxially with respect to the base axis 4 and at an angle of 90° with respect to the rotation axis 11 and in a manner intersecting them at the deflection point 23. This allows the user, when looking through the targeting element 70 or the through opening 70', to look directly in the direction of an emitted transmission light beam 13.

Figure 5A:
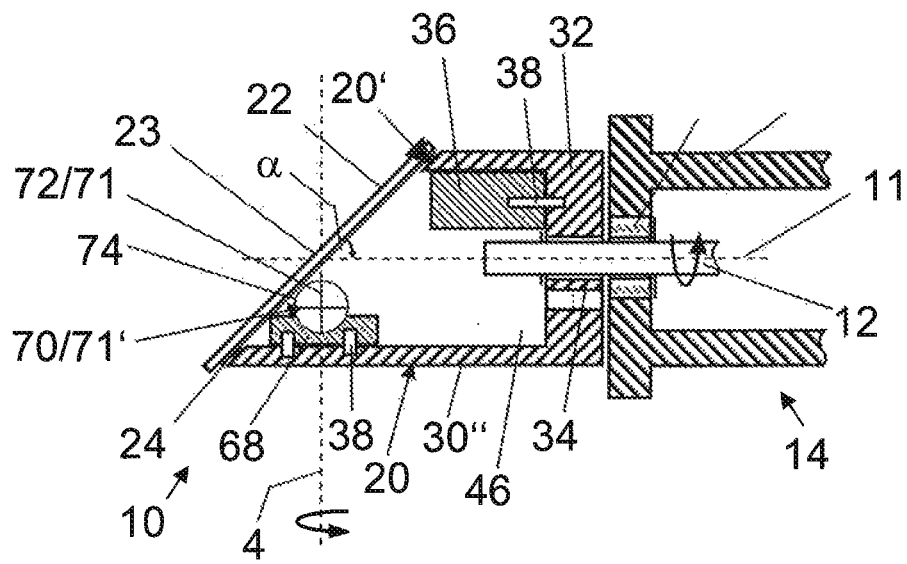
FIG. 5a shows a further embodiment of the rotation unit according to the invention in longitudinal section.
Figure 5B:
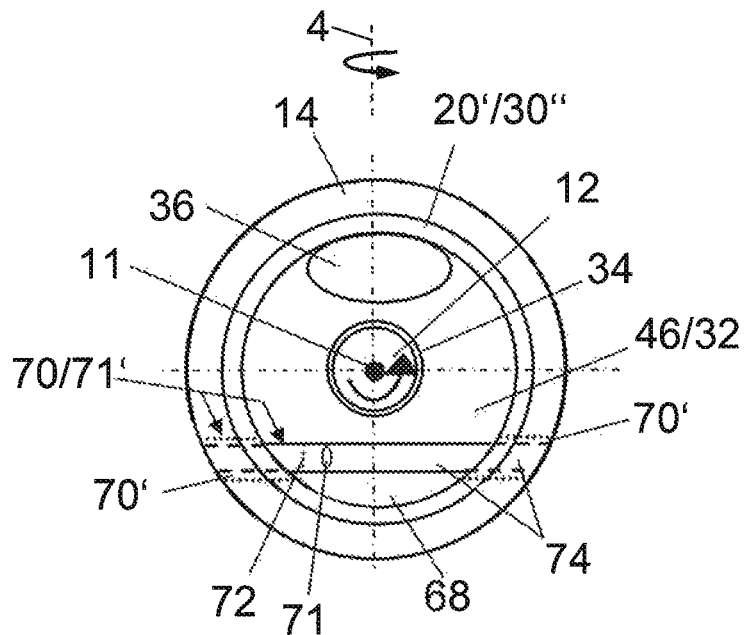
FIG. 5b schematically shows the rotation unit from FIG. 5a in a view of the end side without the deflection element.

The embodiment of the rotation unit 10 illustrated in FIGS. 5a and 5b differs from the embodiment in accordance with FIG. 4a in particular in that the rotation body 20 is embodied as a hollow, beveled cylinder, namely preferably formed from a light metal such as aluminum or an aluminum alloy. However, the use of plastic, in particular fiber reinforced plastic, is also conceivable. A cavity 46 encompassed by the cylinder is delimited by the cylinder wall 30" laterally and by a cylinder base 32 on the end facing the motor housing 14. The cavity 46 extends as far as the free, beveled end 20' of the rotation body 10, wherein the deflection element 22 in this configurational form is connected to the rotation body 20 by adhesive bonding connections 24 at the end faces of the cylinder wall 30". The cylinder wall 30" contains through openings 70' (FIG. 5b) configured such that a tube 74 can be received therein. The tube 74 can be shorter than the distance between the lateral surface of the cylinder walls 30" of the rotation body 20, said distance being defined by the through openings 70', or can be rounded flush with the lateral surface of said cylinder walls 30". In this example, the tube 74 serves for receiving a reticle as target marking 72 and a magnifying optical unit 71, such that the tube 74 or the targeting element 70 is configured in the sense of a telescope 71'. In addition to a fixing in the through openings 70', the tube 74 is supported on a supporting element 68 secured with an accurate fit with the aid of at least one holding element 38 on the cylinder wall 30 of the rotation body 20. The mounting of tube 74, supporting element 68 and possibly required balancing elements 36, etc. is carried out before the mounting of the deflection element 22 from the free end 20' of the rotation body 20, preferably by the manufacturer of the rotation body 20, but can, of course, also be carried out subsequently as well. Given a sufficiently thick cylinder wall 30", a supporting element 68 can be dispensed with under certain circumstances. However, this also depends e.g. on the wall thickness and the material of the tube 74 and on the desired speeds at which the rotation body 20 is intended to rotate during a scan.

If balancing elements 36 are provided, they advantageously comprise material having a relative density greater than that from which the rotation body 20 is produced, such as brass, for example. This enables static and dynamic balancing of the rotation body 20, which prevents mounting of the shaft 12 by unbalance and shaft bending caused by unbalance and avoids vibrations excited by unbalance. Such balancing, with the use of interchangeable balancing elements having different masses and/or geometries, is typically carried out by the manufacturer of the rotation unit 10 or of the rotation body 20. The use of different materials for the different components of the rotation body 20 or of the deflection unit 10, for example aluminum or plastic as a lighter material for the rotation body 20 and brass as a heavier material for balancing elements 36, advantageously enables the length of the rotation body 20 to be made comparatively short.

FIG. 5b shows the rotation unit 10 from FIG. 5a in a frontal view of the rotation body without the deflection element, that is to say looking perpendicularly relative to the cylinder axis 11.

The shaft 12 is situated in the center rotatably about the rotation axis 11. What are visible concentrically around that, successively from the inner area outward, are a press-fit 34—receiving the shaft 12—in the cylinder base 32, the cylinder base or the cavity 46 situated in front of that, and the end side 20' of the cylinder wall 30" and the motor housing 14. A first balancing element 36 shaped elliptically purely by way of example in cross section, is arranged at the top in this illustration, in a manner adjoining the cylinder wall 30". For the targeting element 70 in FIGS. 5a, 5b, and also correspondingly for the embodiments in FIGS. 2, 3 and 4a, the following holds true: the targeting element 70 is arranged in the rotation body 20 with its axis or with the axis of its field of view (its graticule/reticle) intersecting the base axis 4 at an angle of 90°. It is likewise arranged in a manner rotated by 90° relative to the rotation axis 11, but with a defined lateral offset with respect to said axis 11 and with respect to the deflection point 23 of the transmission light beam 13 on the deflection element 22.

Figure 6A:
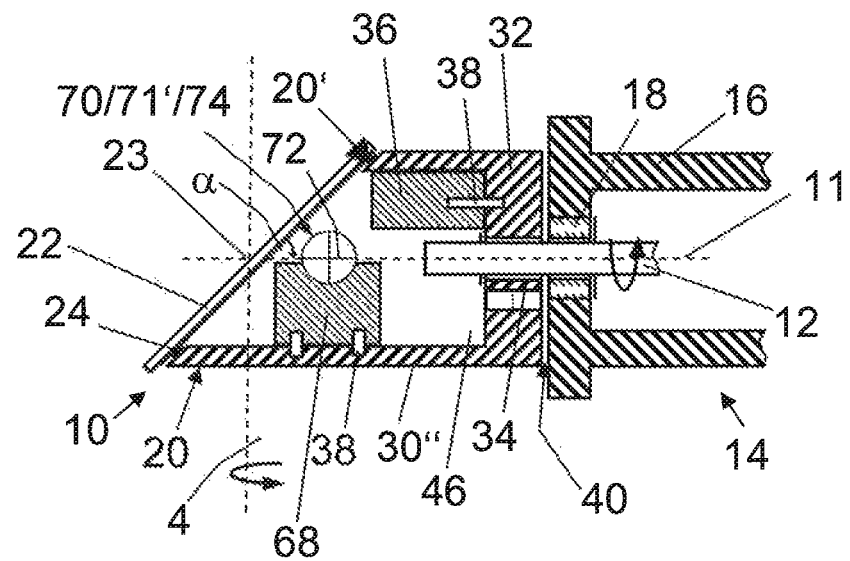
FIG. 6a shows another embodiment of the rotation unit according to the invention in longitudinal section.
Figure 6B:
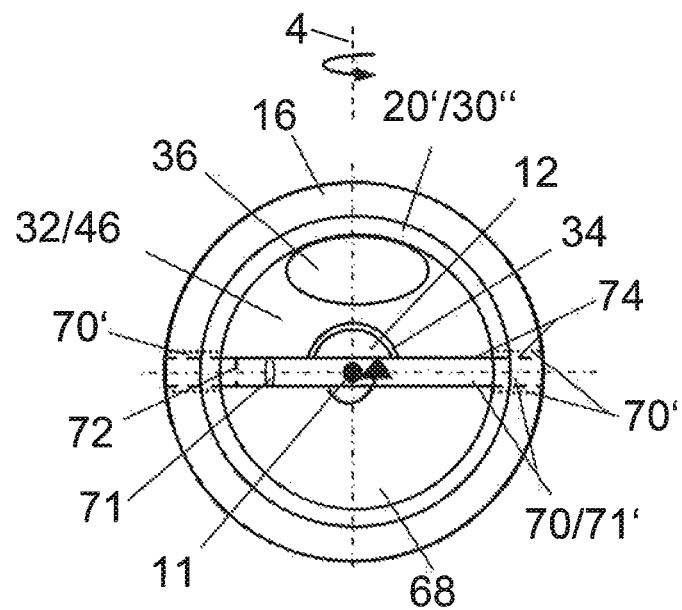
Figure 8:
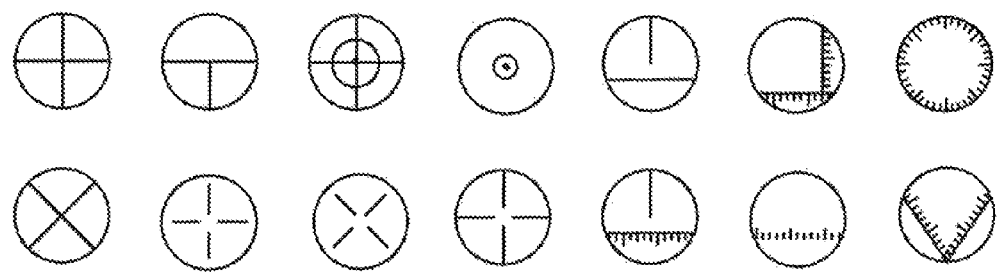
FIG. 8 shows examples of target marking that assists in the accurate sighting of a target.

FIGS. 6a, 6b show a configuration of a rotation unit 10 according to the invention that is very similar to the exemplary embodiment in accordance with FIGS. 5a, 5b. In the same way as in the embodiment shown therein, the targeting element 70 here is arranged in the rotation body 20 in a manner rotated by an angle of 90° with respect to the rotation axis 11 and in a manner rotated at an angle of 90° with respect to the base axis 4. In this case, however, the axis of the targeting element 70 or the axis of the field of view thereof does not intersect the base axis 4, but rather the rotation axis 11, and instead of a defined offset relative to the rotation axis 11 here there is a defined offset relative to the base axis 4 and with respect to the deflection point 23.

Figure 7:
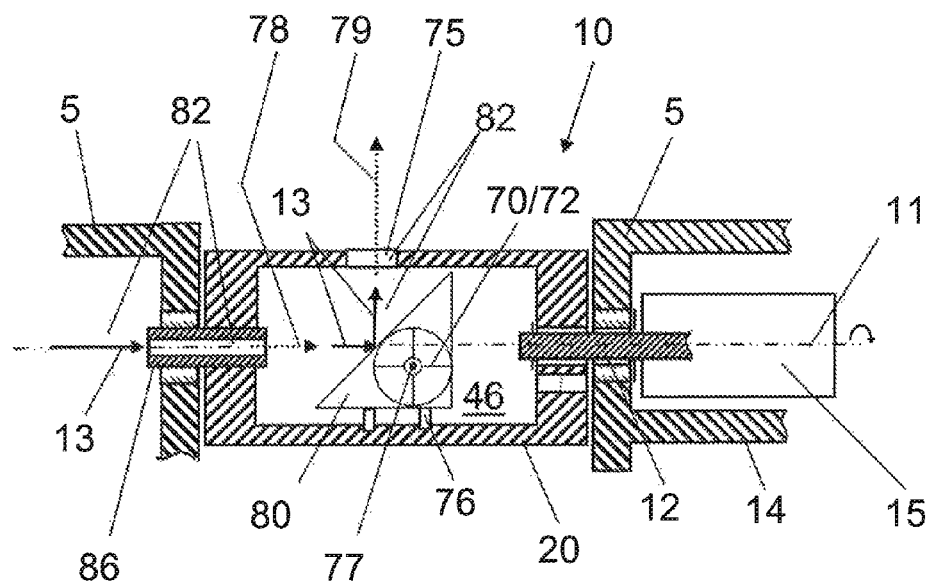
FIG. 7 shows an excerpt from the measuring device with a further embodiment of a rotation unit according to the invention in an illustration analogous to FIG. 3.

FIG. 7 shows a rotation unit 10 according to the invention having a rotation body 20 mounted rotatably on two sides, such that the rotation body 20 could also be designated as being embodied in a continuous design. On one side, the rotation body 20 is connected to a first shaft 12 for conjoint rotation, said first shaft being driven by the motor 15, and, on the opposite side, the rotation body is connected to a second shaft 86 for conjoint rotation, said second shaft being mounted in a freely rotating fashion in the housing 5.

In a variant of this embodiment, the rotation body is embodied as a hollow shaft and, on one side, is mounted directly in a freely rotating fashion in the housing 5 and, on the other side, is connected directly to the drive unit of the motor, such that the shafts are superfluous, which simplifies the design and makes it more cost-effective. Of course, mixed forms of these two designs are also conceivable.

The deflection element 22 is integrated in the rotation body 20 and is embodied as a three-dimensional component 80 having an optically deflecting effect, said component being transparent to the visible light in a viewing direction 77, wherein the viewing direction 77 deviates from a direction 78 of incidence in which the transmission light beam 13 impinges on the deflection element 22, and the deflection element 22 is integrated in the rotation body 20 in such a way that one looks through the optical component 80 when looking through the opening in the targeting element 70, said opening passing through the rotation body 20, in the viewing direction 77. In the example shown here, the viewing direction 77 deviates from the direction 78 of incidence and from the deflecting direction 79 at which the transmission beam 13 is transmitted into the environment from the deflection element 22, wherein in this example advantageously the viewing direction 77, the direction 78 of incidence and the deflecting direction 79 are in each case perpendicular to one another. It goes without saying that for the reflected transmission light beam 13, which arrives as the reception light beam 17 (not illustrated here) on the deflection element 22, the direction 78 of incidence and the deflecting direction 79 are reversed (not illustrated).

Instead of the configuration just outlined and illustrated in FIG. 7, it is likewise conceivable that the viewing direction and the deflecting direction at which the transmission beam is transmitted into the environment are identical, such that, when looking through the targeting element equipped with the optically active component, one looks in the direction of the transmission light beam that can be emitted or reception light beam that can be received. In such a case, it is advantageous if the component having an optically deflecting effect comprises a semitransparent mirror which reflects wavelengths of the transmission light beam or reception light beam in the direction of incidence or deflecting direction and transmits visible light having a different wavelength in the viewing direction.

In the example shown in FIG. 7, the three-dimensional component 80 having an optically deflecting effect is embodied as a prism, namely with a typical triangular configuration in cross section. However, some other component having an optically deflecting effect or a prism having a different prism shape would be conceivable, depending on what is best adapted to the respective requirements.

In the embodiment of the measuring device 1 shown as an excerpt in FIG. 7, the rotation body 20 and all further necessary components, in this example in particular the second shaft 86 of the measuring device 1, have a passing path 82 on which transmission light beam 13 and reception light beam 17 are guided to the deflection element 22 and away from the latter. In the example shown, the rotation body 20 is produced from metal and as a hollow cylinder, such that its cavity 46 simultaneously forms part of the passing path 82. A further part of the passing path formed by an opening 75 in the cylinder wall of the as a hollow cylinder rotation body 20 which, in relation to the deflection means 22 in the deflecting direction 79, frees the path for the transmission light beam 13 and reception light beam 17 (not illustrated).

In the example shown, the three-dimensional, optically active component 80 is provided with a with a target marking 72 in the form of a reticle in the viewing direction. Furthermore, an optical unit 71 for example for magnification can also be provided. Optical unit 71 and also target marking 72 can be applied to the three-dimensional, optically active component 80 directly in the viewing direction 77. In this case, by way of example, in the viewing direction 77, optical lenses can be applied by adhesive bonding or secured by means of a corresponding mount on the optically active component 80. The target marking 72, too, in the viewing direction 77, can be adhesively bonded or painted onto the three-dimensional, optically active component 80 or be secured by means of corresponding mounting thereon.

In the explanations given above, various details have been shown and/or described by way of example in combination with one another. However, this does not mean that they can be combined with one another only in the form shown and/or described. The person skilled in the art knows in what way details of the embodiments shown and/or described above can be expediently combined with one another within the scope of the invention claimed in the claims, even though not all combinations were able to be presented here for reasons of space.

What is claimed is:

1. A measuring device for optically measuring an environment, comprising a rotatably mounted measuring head and comprising:
   a beam source integrated in the measuring head and serving for generating a transmission light beam,
   a reception sensor integrated in the measuring head and serving for detecting a reflected transmission light beam returning as a reception light beam, and
   comprising a rotation unit, which is mounted in the measuring head and which has a rotation body, which is mounted rotatably about its rotation axis at least on one side, with a deflection element for the aligned deflection of the transmission light beam into the environment and capture and deflection of the reception light beam,
   wherein a targeting element is integrated in the rotation body, said targeting element comprising an opening passing through the rotation body.

2. The measuring device according to claim 1, wherein a control unit is provided, which is configured by software in such a way that:
   spatial coordinates of a target sighted with the aid of the targeting element are acquirable and storable and motors for rotating rotation body and/or measuring head are controllable in such a way that the transmission light beam is alignable with said target and/or
   motors for rotating measuring head and/or rotation body are drivable such that the targeting element integrated in the rotation body is alignable with predetermined coordinates.

3. The measuring device according to claim 1, wherein: the targeting element comprises a tube insertable into the rotation body, or a telescope.

4. The measuring device according to claim 1, wherein: the targeting element is equipped with an optical unit and/or with a target marking.

5. The measuring device according to claim 1, wherein:
the targeting element is arranged in the rotation body at a defined angle with respect to the transmission light beam impinging on the deflection element at a deflection point.

6. The measuring device according to claim 5, wherein the defined angle comprises an angle of 90° with respect to the rotation axis.

7. The measuring device according to claim 1, wherein:
the rotation body is produced from a lightweight material having a low relative density, wherein the material comprises one or more of the following substances: plastic, fiber reinforced plastic, light metal, aluminum, an aluminum alloy.

8. The measuring device according to claim 1, wherein the rotation body is embodied in a solid fashion.

9. The measuring device according to claim 1, wherein the rotation body is produced in the form of a lightweight construction.

10. The measuring device according to claim 1, wherein:
the rotation body is embodied as a hollow cylinder, and the targeting element comprises an insertable tube and/or an optically active component.

11. Measuring device according to claim 1, wherein:
the rotation body is mounted rotatably on one side and has a beveled, free end,
wherein the deflection element is provided at the beveled, free end.

12. A calibration of a measuring device according to claim 11, wherein:
a two-position measurement is carried out by the targeting element integrated into the rotation unit and concomitantly rotating therewith, errors both in the horizontal collimation and in the vertical index and the rotation axis skew are determined in an automated manner on the basis of said two-position measurement, and the targeting element is calibrated in relation to the axial system of the measuring device, and in that the position of the measurement beam in relation to the axial system is optionally calibrated with the targeting element calibrated in this way.

13. The measuring device according to claim 1, wherein:
the rotation body is mounted rotatably on two sides,
the deflection element is integrated in the rotation body, and the rotation body and all further required components of the measuring device have a passing path on which transmission light beam and reception light beam are guidable to the deflection element and away from the deflection element.

14. The measuring device according to claim 13, wherein:
the deflection element is a three-dimensional component having an optically deflecting effect and is a prism, wherein the viewing direction deviates from a direction of incidence in which the transmission light beam impinges on the deflection element, and the deflection element is integrated in the rotation body in such a way that one looks through the optically active component when looking through the opening in the targeting element, said opening passing through the rotation body, in the viewing direction, wherein the optically active component is preferably provided with an optical unit and/or with a target marking in the viewing direction.

15. The measuring device according to claim 14, wherein:
the viewing direction through the optically active component deviates from the direction of incidence and from a deflecting direction at which the transmission beam is transmitted into the environment from the deflection element, wherein the viewing direction and the deflecting direction are coaxial and are perpendicular to the direction of incidence.

16. The measuring device according to claim 15, wherein the viewing direction, the direction of incidence and the deflecting direction are perpendicular to one another.

17. The measuring device according to claim 14, wherein the prism is transparent to the visible light in a viewing direction.

18. The measuring device according to claim 1, wherein:
the deflection element is embodied as a semitransparent mirror and is aligned at an angle of 45° with respect to the rotation axis and with respect to the base axis in such a way that
the transmission light beam impinges on the deflection element at a deflection point and is deflected during operation, wherein the deflection point corresponds to the point of intersection of the rotation axis and the base axis, and
the targeting element or the continuous opening in the rotation body meets the semitransparent deflection element in such a way that it is aligned at an angle of 90° with respect to the rotation axis and coaxially with respect to a deflecting direction at which the transmission beam is transmitted into the environment from the deflection element.

19. The measuring device according to claim 1, wherein the measuring device comprises a laser scanner.

20. The measuring device according to claim 1, wherein a control unit is provided, which is configured by software in such a way that:
spatial coordinates of a target sighted with the aid of the targeting element are acquirable and storable and motors for rotating rotation body and/or measuring head are controllable in such a way that the transmission light beam is alignable with said target and
motors for rotating measuring head and/or rotation body are drivable such that the targeting element integrated in the rotation body is alignable with predetermined coordinates.

* * * * *